Jan. 16, 1951 A. VISCHER, JR 2,538,661
PRESSURE CONTAINER AND CLOSURE
Filed Aug. 3, 1944 3 Sheets-Sheet 1
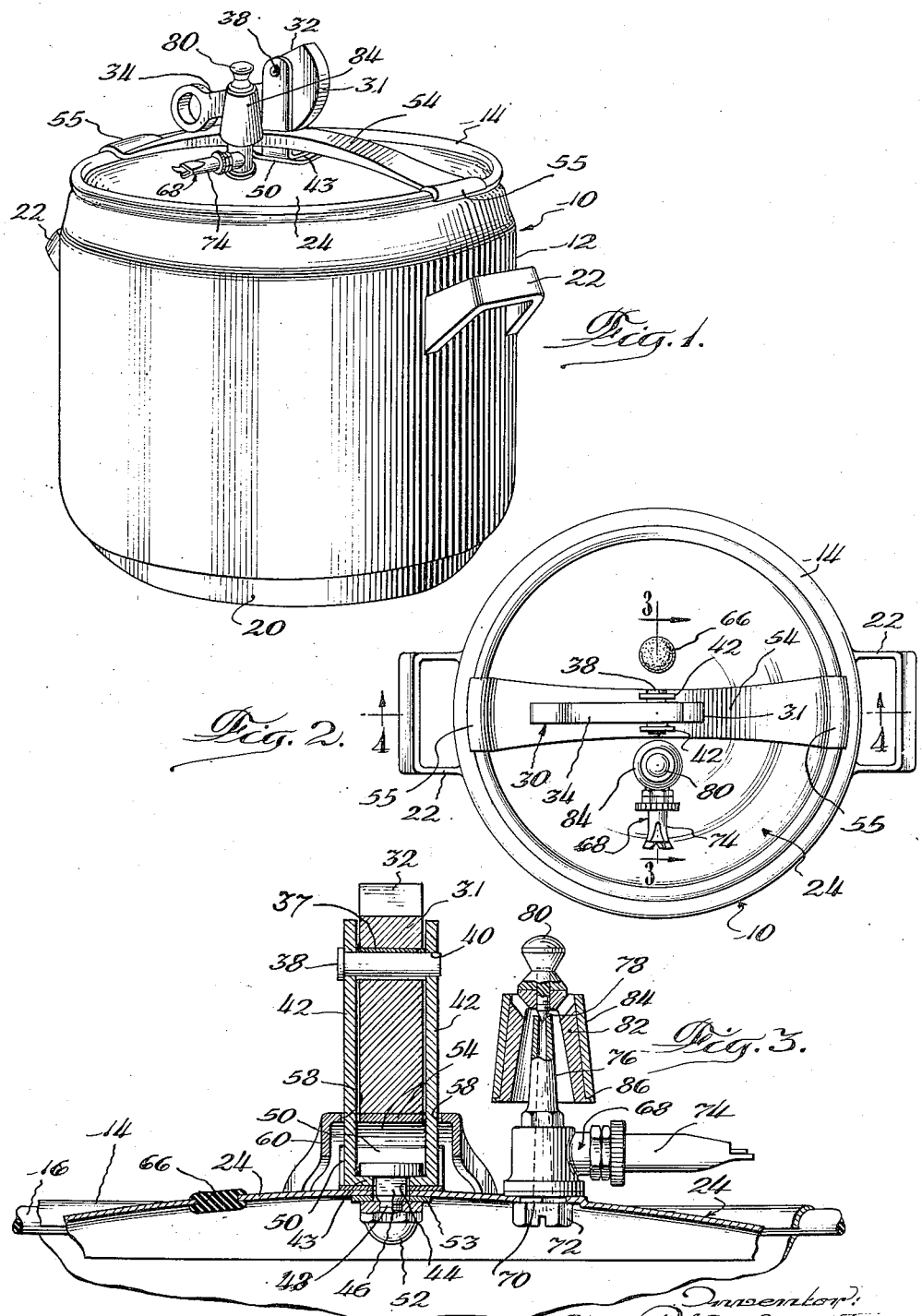
Inventor:
Alfred Vischer, Jr.
By Williams, Bradbury & Hinkle
Attorneys

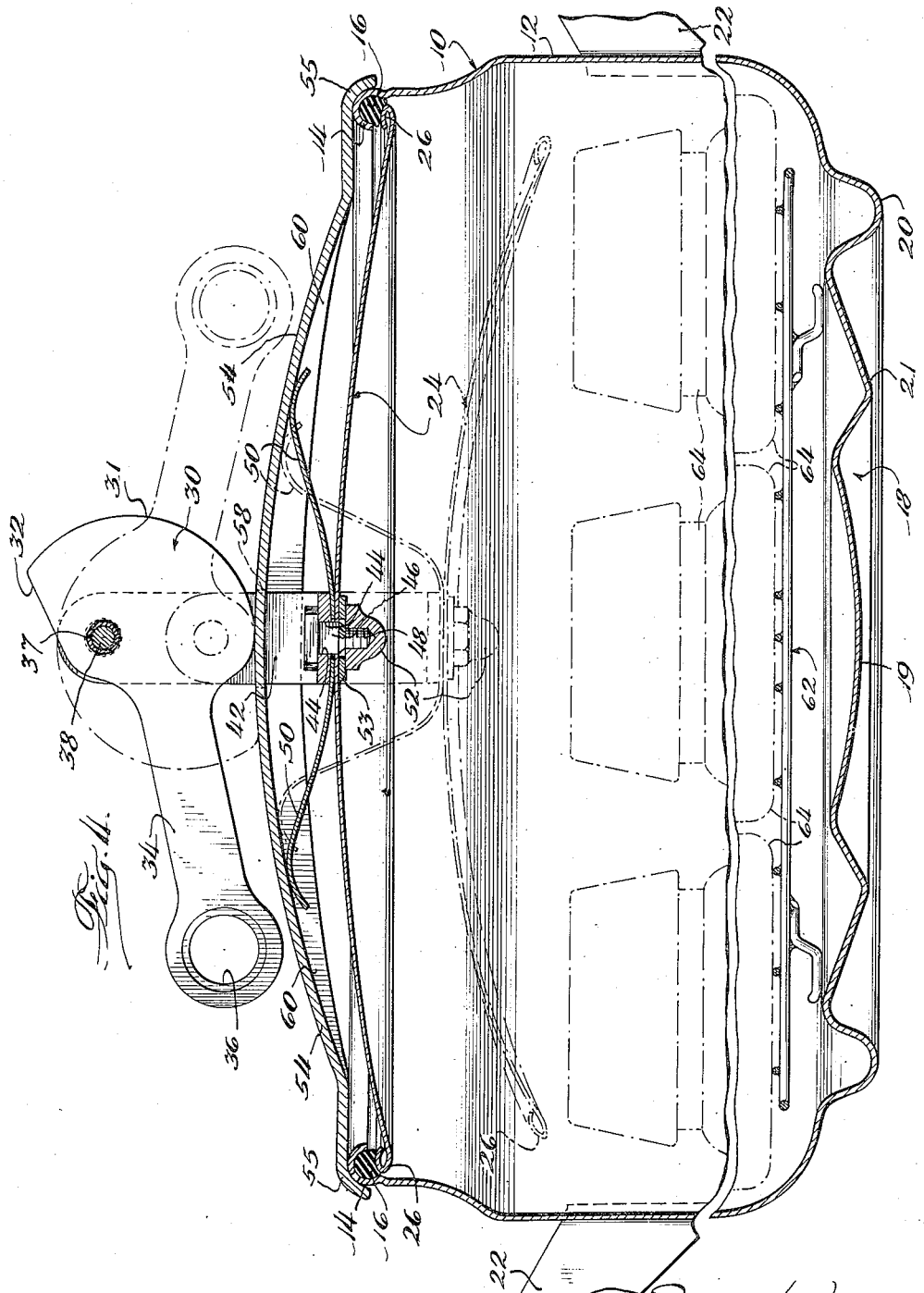

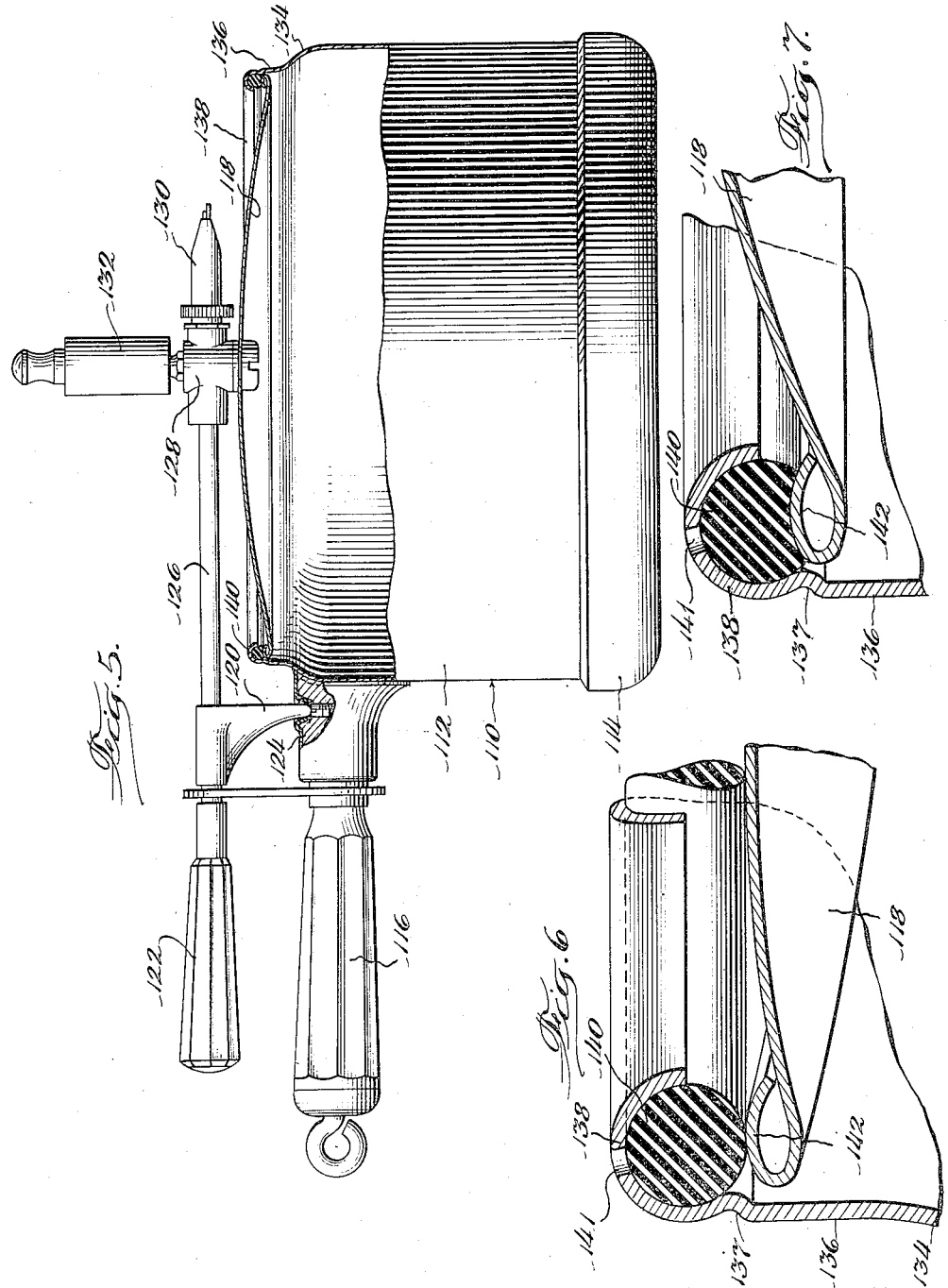

Patented Jan. 16, 1951

2,538,661

UNITED STATES PATENT OFFICE 2,538,661

PRESSURE CONTAINER AND CLOSURE

Alfred Vischer, Jr., Park Ridge, Ill., assignor, by mesne assignments, of twelve-thirtieths to Alfred Vischer, Jr., two-thirtieths to William Vischer, two-thirtieths to Alfred Vischer, III, two-thirtieths to Alfred Vischer, Jr., as trustee, four-thirtieths to Walter W. Zitzewitz, four-thirtieths to Elmer K. Zitzewitz, one-thirtieth to Gertrude J. Zitzewitz, one-thirtieth to Barbara O. Zitzewitz, and two-thirtieths to Gertrude V. Bouton Application August 3, 1944, Serial No. 547,823

7 Claims. (Cl. 220—25)

My invention relates generally to pressure containers and closures, having improved sealing means and closure operating means, for use particularly as pressure cookers.

The invention disclosed herein constitutes an improvement of the invention shown in my prior Patent No. 2,282,011. In said patent is disclosed a novel form of flexible closure embodied in a saucepan type of pressure cooker, and in which the seal between the closure and container is effected by a suitable gasket secured to the edge of the closure.

In utilizing said type of closure in large size pressure cookers, it is desirable to provide a closure operating means which has a greater mechanical advantage than the simple lever arrangement shown in said patent. In the larger sizes of pressure cookers, it is also desirable that the closure operating means does not extend materially beyond the projection of the sides of the container.

It is therefore an object of my invention to provide an improved flexible closure operating mechanism, which is easily operated, which is compact and durable, and which may be economically manufactured.

A further object is to provide an improved means for sealing a cover of the flexible type within a container such as a pressure cooker.

A further object is to provide an improved container, forming part of a pressure cooker, which may readily be made of vitreous enameled steel or stainless steel, and which provides means for retaining a readily removable sealing gasket for engagement by the closure.

A further object is to provide an improved pressure cooker having a readily replaceable sealing gasket which is protected against damage in normal use of the cooker.

A further object is to provide an improved pressure cooker which is simple in construction, light in weight, and which is efficient in the utilization of heat.

Other objects will appear from the following description, reference being had to the accompanying drawings, in which:

Fig. 1 is a perspective view of a complete pressure cooker incorporating the invention;

Fig. 2 is a plan view thereof;

Figs. 3 and 4 are sectional views taken on the lines 3—3 and 4—4, respectively, of Fig. 2, drawn to an enlarged scale;

Fig. 5 is a side elevational view of a saucepan type of pressure cooker, portions of the container and closure being shown in central vertical section;

Fig. 6 is an enlarged fragmentary sectional view showing the manner of engagement of the closure and sealing means, the closure being shown in the position in which it is placed prior to being drawn to container closing position; and Fig. 7 is a view similar to Fig. 6, showing the parts in the positions assumed when the closure is in container closing position and subjected to internal pressure.

The pressure cooker shown in the drawings as an illustrative form of the invention, comprises a shell 10 having a cylindrical wall 12. The upper edge of the wall 12 tapers inwardly and terminates in a hollow rim bead 14 forming an annular channel for the reception of a toroidal sealing member 16, which is preferably made of a synthetic rubber substitute which is oil and grease resistant, and the properties of which are not appreciably affected by being subjected to temperatures in the order of 250 F.

As will be pointed out in greater detail hereinafter, in connection with the description of Figs. 6 and 7, the sealing member 16 comprises a cut length of extruded rubber substitute material and is inserted in the annular groove formed within the rib 14, with its ends abutting.

The bottom 18 (Fig. 4) of the shell has annular ribs 20 and 21 and a central downwardly convex portion 19. The rib 20 is adapted to contact the top of a gas or coal stove and the rib 21 is of such diameter as to fit a standard hot plate of an electric range. Both ribs 20 and 21 also serve as means to strengthen the bottom, to better enable it to resist the internal pressure which will usually be in the order of 15 p. s. i. These ribs also are effective in increasing the efficiency of heat transfer from the source of heat to the container. The container is provided with suitable handles 22 which are preferably welded to the shell 10.

While the shell may be made of any suitable material, I prefer to make it of sheet steel having applied thereto, on both the inside and outside surfaces, a coating of vitreous enamel. Such enameled steel container is preferred because of the low specific heat of steel and because of its high emissivity.

The closure comprises a cover 24, preferably a thin stainless steel dished circular disc containing internal strains which cause it normally to assume a warped shape. In its warped shape the vertical projection of the cover (in the direction of its polar axis) is substantially an ellipse having a minor axis substantially less than the diameter of the opening formed by the bead 14, so that the cover may be freely inserted and removed from its operative position inside the shell. The cover is preferably provided with a peripheral bead 26, generally elliptical in transverse section, which affords a smooth rounded surface for engagement with the sealing member 16.

In order to cause the cover 24 to assume its operative shape, it is necessary to pull outwardly at its center while the bead 26 is in engagement with the sealing member 16. This is accomplished by a mechanism comprising a cam 30 having a spiral cam surface 31 and a flat surface 32. The cam is preferably made of a suitable heat resistant plastic, such as a laminated phenolic condensation product, and has an operating arm 34 formed integrally therewith. A finger opening 36 is formed in the enlarged end of the arm 34.

The cam 30 is mounted for free rotation on a split spring bushing 37 frictionally gripping a pin 38, the ends of the latter projecting through holes 40 formed in the ends of the upwardly extending arms of a U-shaped yoke 42. This forms a very simple and convenient means for pivotally mounting the cam 30. It is necessary merely to insert the bushing 37 in the cam, place the cam in position between the arms of the yoke, and then press the pin 38 through the holes 40 and bushing 37. The cross-piece 43 of the yoke 42 has square hole 44 therein to receive the complementally shaped shank portion 46 of a bolt 48. The square shank 46 also extends through square holes formed in a double leaf spring 50 and in the cover 24. These parts are thus nonrotatably clamped to the yoke 42 by an acorn nut 52 and washer 53.

A beam 54 has its ends 55 conformed to rest upon the upper surface of the bead 14. The beam 54 has a pair of rectangular slots 58 through which extend the vertical arms of the yoke 42, the yoke 42 thus being guided for vertical movement relative to the beam 54. The beam 54 has strengthening flanges 60 of graduated depth. These flanges also serve as partial enclosures for the ogee shaped end portions of the spring 50.

The spring 50 operates to keep the beam spaced away from the cover as far as permitted by the cam 30, and thus facilitates the insertion and removal of the cover.

A welded wire mesh trivet 62 rests on the bottom 18 to support jars 64 containing the food to be canned.

A pressure relief device 66 plugs an aperture in the cover 24 and is adapted to blow out when the pressure in the shell exceeds a predetermined value, such as 25 to 35 p. s. i., in the manner more fully disclosed in my prior Patent No. 2,301,724.

A T fitting 68 is secured to the cover in steam tight relation by a hollow stud 70 having a castellated head 72. A pressure indicator 74, which may be of the type shown in my prior Patent No. 2,252,874, is secured to one branch of the fitting 68, while a hollow stem 76 is secured to the other branch of this fitting.

A pressure regulating valve 78, which may be molded in a knob 80 made of a suitable plastic, is threaded in a weight 82 and rests upon the end of the stem 68, closing the opening in the end thereof. A removable additional weight sleeve 84 fits over the weight 82 and rests on a flange 86 of the latter. The presence or absence of the sleeve weight 84 thus provides a simple means for determining the pressure at which the valve will unseat, as, for example, 15 p. s. i. or 10 p. s. i.

In using the pressure cooker or canner, after the food containing jars 64 and a small quantity of water have been placed in the shell, the cover, in its warped shape, is slid into the position in which it is shown in dotted lines in Fig. 4, and the ends 55 of the beam 54 positioned to rest upon the rim bead 14. The cam 30 is then swung from its dotted to its full line position, thus pulling upwardly upon the center of the cover 24. As the bead 26 of the cover engages the sealing member 16, the cover flexes and snaps into the shape shown in full lines in Fig. 4. It will be noted that during the first third of the angular displacement of cam 30 the entire cover will be moved freely through approximately two-thirds of its total upward stroke and that the remaining two-thirds of the angular movement of the cam results in moving the center of the cover through the remaining one-third of its stroke, since it is during the latter one-third of its upward movement that the work is expended in flexing the cover, bringing its entire periphery into sealing engagement with the sealing member 16.

Upon application of heat to the shell, steam will be generated and the pressure of the steam against the cover firmly presses the bead 26 of the cover against the sealing member 16, assuring a steam-tight seal at all times. The maximum pressure generated will be controlled by the weighted valve 78. After the food has been subjected to the heat conveyed by the steam for the required length of time, the application of heat is discontinued, and after the pressure has dropped to atmospheric due to the partial cooling of the container and its contents, the cam 30 is swung to dotted line position and the cover removed.

The improved sealing means described generally above may also be incorporated in a pressure cooker of the saucepan type, as shown in Fig. 5.

The pressure cooker comprises a container 110 of the saucepan type having a generally cylindrical shell 112 and a reinforced bottom 114. A handle 116 is suitably secured to the shell 112. The container is provided with a flexible sheet metal closure 118 which, as in the previously described embodiment of the invention, has internal stresses such that it normally assumes a warped shape, elliptical in vertical projection, so that it may be inserted into the smaller circular opening formed in the top of the shell. Upon being inserted, the fulcrum 120, rigid with handle 122, is inserted in a suitable recess 124, and by pressing the handle 122 toward the handle 116, the closure 118 is drawn up against the sealing surface within the container 112, assuming a shape which is circular in vertical projection. The handle 122 is attached to the closure 118 by a rod 126 secured in a suitable fitting 128. The fitting 128 is rigidly secured to the closure 118 and forms the mounting means for a pressure indicator 130 and a pressure regulating device 132.

In accordance with the principles of the present invention, the upper portion of the shell has an inwardly directed tapered section 134 which is joined by a section 136 of considerably less taper and an annular indentation 137 with an inturned hollow rolled flange or rim bead 138. A sealing member 140 fits snugly within an annular groove formed by the flange 138 and the annular indentation 137. The sealing member 140, as mentioned above, is preferably made of a semi-soft synthetic rubber substitute which is resistant to grease and is capable of withstanding temperatures in the order of 260° F. without appreciable loss of its resiliency and elasticity.

The sealing member is preferably cut of a length slightly greater than required to fill the annular space formed within the hollow rim bead 138. The sealing member 140 is thus slightly compressed longitudinally when it is inserted in the rim bead 138 and its ends will thus be held in abutment. The abutting ends of the sealing member 140 thus form a joint which is steam-tight when the closure is pressed against the sealing member in the normal use of the cooker.

Also due to this longitudinal compression of the sealing member 140, it tends to press radially outwardly against the outer portion of the rim bead 138 and thus will lie above the annular indentation 137. It is nearly impossible to obtain extruded sealing member stock in which the diameter and degree of roundness are maintained with close tolerances. By virtue of the construction illustrated, in which the sealing member 140 is longitudinally compressed and thus pushes radially outwardly into the groove within the bead 138, considerable variation in the cross sectional diameter is permissible without preventing good sealing contact with the peripheral surface of the closure.

Furthermore, because of this construction, the sealing member may be more easily inserted and removed from the container during the initial assembly and upon such occasions when the sealing member is to be replaced. To facilitate the removal of the sealing member, should replacement or cleaning thereof ever become necessary, the hollow rim bead is provided with a small opening 141 (Figs. 6 and 7), into which a blunt rod or the like may be inserted to engage the sealing member 140 and push a portion of it from the groove in the bead. Such portion may then be grasped easily and the entire sealing member pulled from its groove.

The sealing member and container of the embodiment of Figs. 1 to 4 cooperate in the same manner as described above with reference to Figs. 6 and 7, and the latter figures may be considered as being fragmentary sectional views of both of the embodiments disclosed herein.

The closure 118 is provided with a peripheral curled flange or bead 142, which presents, in section, a generally elliptical surface for contact with the sealing member 140.

The closure 118 is shown in Fig. 6 in the position assumed prior to being drawn into its effective closing position, while Fig. 7 illustrates the closure 118 in the position and shape assumed after it has been drawn to its effective closed position. As shown in the latter figure, the flange 142 of the closure has deformed the sealing member 140 to some extent so that there is an appreciable area of contact between these two elements. As a result, the pressure load is distributed and there is no tendency of the closure to dig into and lacerate the sealing member, assuring a long useful life for the latter.

In the event that it should become necessary to replace the sealing member, it may readily be removed by the housewife and replaced. This is of considerable commercial advantage inasmuch as the housewife is not required to return the closure 24 to the factory for the attachment of a new sealing member, should the original sealing member become damaged, as was the case with the construction shown in my aforesaid patent. The sealing member 140 is located so that it is not exposed to damage since the flange 138 protects it against contact by spoons, knives, or other kitchen utensils which may be used to handle or stir food in the container.

The sealing member 140 may be of toroidal shape, that is, it may be molded as a ring of generally circular cross section. However, as above pointed out, it is preferably made from a length of "cord," that is, a normally cylindrical strip of extruded synthetic rubber substitute. By cutting a length of this cord slightly greater than the length of cord necessary to fill the groove within the flange 138 (such as ⅛" per foot), the cord may be pressed into place, slightly compressing it lengthwise. Thereafter, when pressure is applied to the sealing member by the cover 118, as indicated in Fig. 4, the sealing member will tend to expand endwise as well as in the manner indicated in Fig. 4, so that the abutting ends of the cord will be firmly pressed together and there will be no leakage.

The invention is of particular utility for use in pressure cookers having shells made of vitreous enameled steel and stainless steel, but the underlying principle thereof may likewise be used to advantage with shells made of cast or drawn metal, such as aluminum. When used with enamel ware containers, the sealing member conforms itself to the unavoidable slight irregularities in the vitreous enameled surface, and thus provides an effective seal, difficult to obtain by any other means.

While the bead 142 is shown as of generally elliptical cross section, it will be apparent that it may be made more or less flat, or of more nearly circular cross section, if desired.

It will be noted further that the shell section 136 serves as a means for guiding and locating the cover with respect to the sealing member 140 so that contact between the sealing surface of the bead 142 and the sealing member 140 is assured, and the cover is centrally located with respect to the opening. The section 134 of the shell also serves as a tapering guiding surface causing the cover to move into the centering section 136.

From the foregoing it will appear that I have provided novel and efficient means for effecting a seal between the container and the flexible type closure therefor and for operating the closure.

This application is a continuation in part of abandoned application Serial No. 501,357, filed September 6, 1943.

While I have shown and described particular embodiments of my invention, it will be apparent to those skilled in the art that numerous variations and modifications thereof may be made without departing from the underlying principles of the invention. I therefore desire, by the following claims, to include within the scope of my invention all such variations and modifications by which substantially the results of the invention may be obtained by the use of substantially the same or equivalent means.

I claim:

1. A pressure cooker comprising a vessel formed of sheet metal, having a circular opening and an annular groove surrounding and immediately adjacent said opening, said groove facing inwardly of said vessel in an axial direction with respect to said opening, an annular sealing member substantially filling said groove and having a portion of rounded cross section projecting therefrom, and a closure of the flexible sheet metal type having a peripheral false wire bead presenting an axial outwardly facing rounded peripheral surface cooperable with said sealing member to form a pressure-tight seal.

2. The combination set forth in claim 1, in which said groove has a cross section in the form of a segment of a circle, greater than a semi-circle, and said sealing member is toroidal in shape.

3. A pressure cooker comprising a sheet metal generally cylindrical shell having an opening in the top thereof and having an inwardly curled annular flange surrounding said opening, said flange providing an annular groove opening downwardly into said shell, an elastic sealing member filling said groove and projecting therefrom to provide a sealing surface, and a closure of the flexible sheet metal type having a peripheral bead cooperable with the sealing surface of said sealing member to effect a steam-tight seal therewith.

4. A pressure cooker comprising a shell having an opening in the top thereof and having formed therein an annular groove surrounding and immediately adjacent said opening and facing downwardly into said shell, an elastic sealing member made of a synthetic rubber substitute filling said groove and projecting therefrom to provide a rounded sealing surface, a flexible sheet metal closure having a peripheral upwardly facing annular sealing surface cooperable with the sealing surface of said sealing member to effect a steam-tight seal therewith, and means to hold said shell and cover together with said sealing surfaces in contact with each other.

5. A pressure cooker comprising a vessel having a circular opening and an annular groove surrounding said opening, said groove facing inwardly of said vessel in an axial direction with respect to said opening, said groove being in the form of the major section of a torus cut by a plane generally perpendicular to its axis, a toroidal shaped sealing member of a relatively soft synthetic rubber substitute substantially filling said groove and projecting therefrom, and a closure of the flexible sheet metal type having an axial outwardly facing rounded peripheral surface cooperable with said sealing member to form a pressure-tight seal.

6. The combination set forth in claim 1, in which said groove has a cross section in the form of a segment of a circle, greater than a semi-circle, and in which the portion of the vessel forming said groove is provided with a small aperture normally sealed by said sealing member for the reception of an instrument by means of which a portion of the length of said sealing member may be pushed from said groove.

7. A pressure cooker comprising a sheet metal generally cylindrical shell having an opening in the top thereof and having an inwardly curled annular flange surrounding said opening, said flange providing an annular groove opening downwardly into said shell, an elastic sealing member filling said groove and projecting therefrom to provide a sealing surface, said shell having an annular indentation immediately below said flange so as to provide with said flange a surface encompassing more than 180° of the transverse section of said sealing member, and a closure of the flexible sheet metal type having a peripheral bead cooperable with the sealing surface of said sealing member to effect a steam-tight seal therewith.

ALFRED VISCHER, Jr.

REFERENCES CITED

The following references are of record in the file of this patent:

UNITED STATES PATENTS

| Number | Name | Date |
| --- | --- | --- |
| 1,935,094 | Krause | Nov. 14, 1933 |
| 2,148,468 | Hothersall | Feb. 28, 1939 |
| 2,187,919 | Thompson | Jan. 23, 1940 |
| 2,282,011 | Vischer, Jr. | May 5, 1942 |
| 2,390,445 | Mercier | Dec. 4, 1945 |
| 2,407,627 | Chandler | Sept. 17, 1946 |

FOREIGN PATENTS

| Number | Country | Date |
| --- | --- | --- |
| 272,093 | Great Britain | June 9, 1927 |
| 310,852 | Great Britain | Aug. 1, 1930 |